United States Patent [19]
Neal et al.

[11] 3,943,507
[45] Mar. 9, 1976

[54] VEHICLE BACK-UP ALARM

[75] Inventors: Franklin D. Neal; Raymond Mirly, both of Cape Girardeau, Mo.

[73] Assignee: Raymond Mirly, Cape Girardeau, Mo.

[22] Filed: Oct. 29, 1974

[21] Appl. No.: 518,927

[52] U.S. Cl. .............................. 340/384 E; 340/70
[51] Int. Cl.² ........................................ B60Q 3/00
[58] Field of Search .......... 340/384 E, 70, 223, 271, 340/56, 384 R

[56] References Cited
UNITED STATES PATENTS

| | | | |
|---|---|---|---|
| 3,284,796 | 11/1966 | Borsattino | 340/70 X |
| 3,728,676 | 4/1973 | Brown | 340/70 |

Primary Examiner—Harold I. Pitts
Attorney, Agent, or Firm—Jones, Tullar & Cooper

[57] ABSTRACT

A solid state alarm circuit for producing intermittent alarm signals when a vehicle is operated in reverse. The circuit includes a sound generator modulated by a pulse generator to produce bursts of oscillations which drive sound producing loudspeakers.

4 Claims, 5 Drawing Figures

VEHICLE BACK-UP ALARM

BACKGROUND OF THE INVENTION

The present invention relates to vehicles, and more particularly to vehicle safety alarms for warning bystanders when the vehicle is shifted into reverse gear.

Because of the danger to personnel in areas where large vehicles such as trucks, crawler tractors, heavy duty bulldozers, graders, agricultural and industrial tractors, and other machines are being used, as at construction sites, alarms are often provided on such vehicles to warn of backward motion of the vehicles. The lack of rearward visibility from such machinery, together with the high noise level that usually exists in areas where such machinery is in use, produces a very hazardous environment, and accordingly Federal health and safety regulations require the provision of an adequate audible warning device on this type of equipment.

Many such alarm systems have been provided for this purpose, but a need still exists for a highly reliable, damage-resistant, heavy duty alarm that will produce a suitable signal and which is adaptable for use on all vehicles. Further, such a device should be easily attached for convenient, reliable operation, and should be sufficiently economical to insure availability to machine operators and owners.

SUMMARY OF THE INVENTION

Accordingly, it is an object of the present invention to provide an economical and reliable alarm system for vehicles.

It is a further object of the invention to provide a warning alarm for vehicles that utilizes solid-state circuitry for economy and reliability, which is rugged and long-lasting, which is adaptable to all vehicles, and which is simple to install.

Another object of the invention is to provide a backup alarm for vehicles that is adapted to be connected into existing backup light circuits, or which may be switch operated to provide ease of installation and adaptability to any vehicle.

Briefly, the present invention is directed to an alarm circuit comprising a free-running oscillator, or sound generator, which is connected through a power amplifier to suitable loudspeakers for producing an audible signal of desired frequency and intensity. A pulse generator is provided which oscillates at a different, preferably sub-audio, frequency and is connected to modulate the output of the sound generator, turning it on and off at a selected pulse rate to produce an intermittent sound from the loudspeakers. A voltage limiter prevents overdriving of the power amplifier and protects the loudspeakers, thus allowing operation of the unit from voltages not only in the range of the usual automotive battery, e.g., 6 or 12 volts, but up to as much as 40 volts.

The circuitry is solid state, and is capable of being placed in hermetically sealed containers to prevent damage to the components, thereby providing an alarm having a high degree of reliability, as well as an alarm which can be used on a variety of on or off-highway vehicles.

BRIEF DESCRIPTION OF THE DRAWINGS

The foregoing and additional objects, features and advantages of the invention will become apparent from consideration of the following detailed description of a preferred embodiment of the invention, taken in conjunction with the accompanying drawings, in which.

DESCRIPTION OF PREFERRED EMBODIMENT

Figure 1:
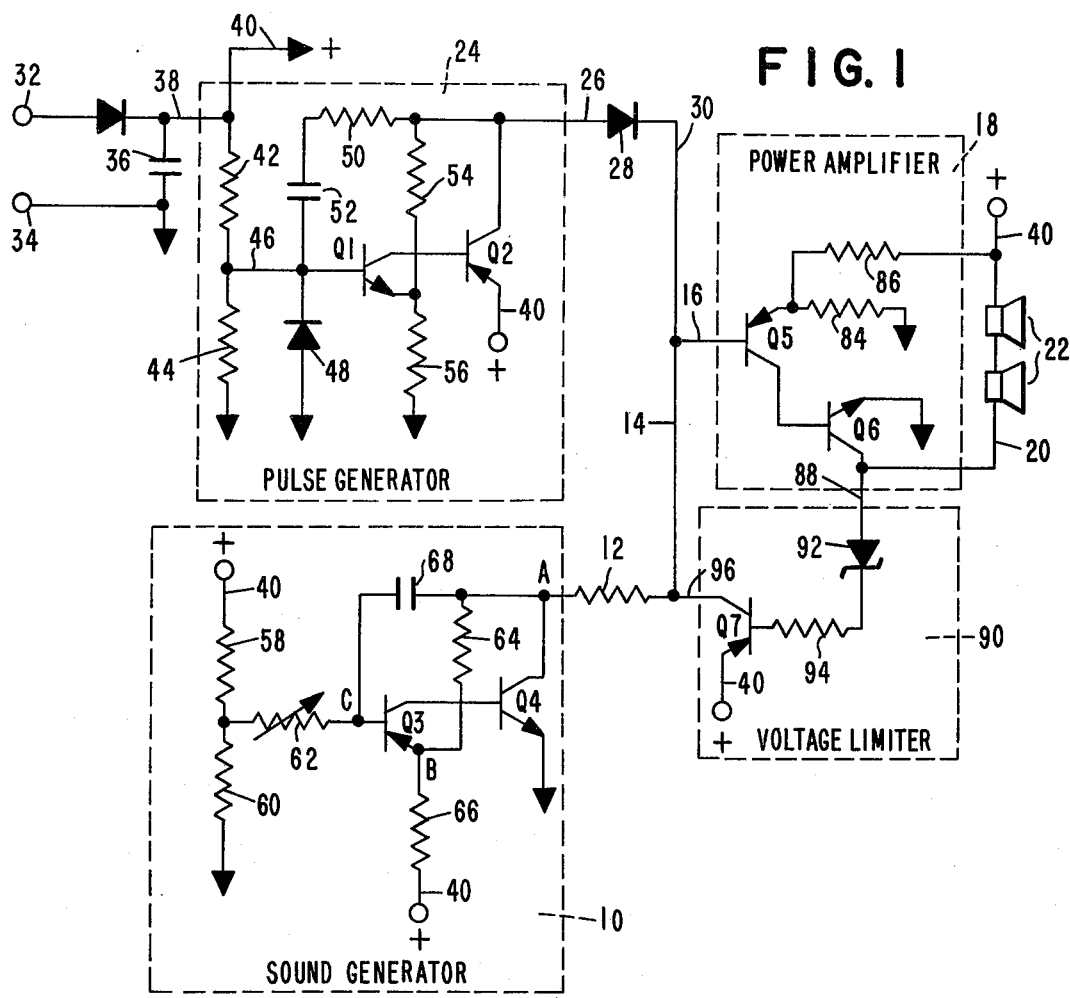
FIG. 1 is a schematic diagram of a preferred circuit arrangement.

Turning now to a detailed consideration of the invention, there is illustrated in FIG. 1 of the drawing a schematic diagram of the improved backup alarm system and circuitry of the present invention. The circuit includes a sound generator 10 which produces oscillations of a selected audio frequency corresponding to the frequency of the sound to be produced by the alarm. The frequency of this generator may vary, but preferably will be in an audio range that will be clearly and distinctly heard by personnel even in high noise environments such as heavy construction areas, so as to insure adequate warning that a vehicle is moving backward. The output of the sound generator 10 is fed by way of resistor 12 and line 14 to the input 16 of a power amplifier 18, where the audio frequency produced by the generator is amplified to the desired level and fed by way of output line 20 to suitable loudspeakers 22.

To improve the likelihood that the alarm will be heard, a pulse generator 24 is provided to produce a periodic modulation of the output from the sound generator. In the preferred form, this modulation takes the form of an alternating on-off voltage pulse appearing on the output line 26 of pulse generator 24, which is fed by way of a diode 28 and a line 30 to the input line 16 of amplifier 18 and the output line 14 of generator 10, respectively. The voltage pulse produced by pulse generator 24 alternates between 0 volts and the D.C. voltage of the vehicle battery supply, which is assumed for purposes of illustration herein to be 24 volts. When the pulse is at the 0 volt level, an operating bias is applied to oscillator 10; when the pulse is at the 24 volt level, the oscillator is cut off. In this manner, a series of periodic bursts of oscillations are fed to the amplifier to drive the loudspeakers.

Power is applied to the present circuit by way of a pair of input terminals 32 and 34, which may be connected to the existing backup light circuit of a vehicle to energize the alarm whenever that light is turned on. Thus, terminal 32 may be connected to the hot wire leading to the backup lamp, and terminal 34 may be connected to a convenient electrical ground point. Alternatively a suitable backup switch may be provided for installation adjacent the gear shift lever or linkage of the vehicle. Such a switch, which might be a microswitch with an actuator arm mounted for engagement by the shift lever or linkage whenever the vehicle is shifted into reverse gear, would provide a voltage to terminal 32 when activated, thereby insuring operation of the alarm circuit.

The voltage applied to terminal 32 is, again, a D.C. voltage corresponding to the battery or other vehicle supply. This voltage is filtered by capacitor 36 to remove transients, and is applied by way of line 38 to the input of pulse generator 24, and by way of line 40 to each of the supply voltage terminals of the circuit. Although the circuit may be used with both positive and negative ground vehicle power supplies, the supply voltage terminals are indicated by the symbol for a positive voltage.

The input to the pulse generator 24 from the power supply indicates a backup alarm condition, and thus the generator is energized. The voltage on line 38 is applied across a voltage divider consisting of resistors 42 and 44, with the junction being connected by way of line 46 to the base of a transistor Q1. The base of the transistor is connected to ground through a diode 48, while the collector of Q1 is connected to the base of a second transistor Q2. The emitter of Q2 is connected to the source of supply voltage on line 40, while the collector of Q2 is connected to pulse generator output line 26.

A feedback loop is connected from the collector of Q2 to the base of Q1 through resistor 50 and capacitor 52, while the emitter of Q1 is connected to the junction of voltage divider resistors 54 and 56. These resistors are connected in series between output line 26 and ground, to provide a bias voltage for transistor Q1.

The sound generator 10 is similar to pulse generator 24, having an input voltage divider comprising resistors 58 and 60 connected in series between the supply voltage on line 40 and ground. The junction of resistors 58 and 60 is connected by way of a variable resistor 62 to the base of oscillator transistor Q3. The collector of Q3 is connected directly to the base of a transistor Q4, the collector of which is connected to the output line 11 of generator 10. The emitter of Q4 is connected to ground, while the emitter of Q3 is connected to the junction of voltage divider resistors 64 and 66. These latter resistors are connected in series between the output line at point A and the supply voltage on line 40 to provide an operating bias to transistor Q3. A feedback loop including a capacitor 68 is connected between the collector of Q4 and the base of Q3.

In operation, the sound generator transistors Q3 and Q4 operate as an oscillator having a frequency determined by the time constant defined by the values of resistor 62, capacitor 68, and the input impedance $R_i$ of transistor Q3. When Q3 is nonconductive, the time constant is defined by the product of the values of resistor 62 and capacitor 68; when Q3 is conductive, the time constant is expressed by the following equation:

$$\frac{R_{62} + R_i}{R_{62} \times R_i} C_{68}$$

Since, however, $R_i$ is very large in comparison to resistor 62, the time constant in the case where Q3 is conductive is approximately equal to the time constant when Q3 is nonconductive. Thus the on and off times of Q3 during oscillation are approximately equal, and the oscillator produces a symmetrical output signal.

Figure 2A:
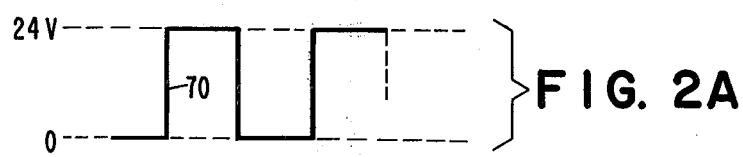
FIGS. 2A-2D are diagrammatic illustrations of the waveforms at selected points in the circuit of FIG. 1.

The output of pulse generator 24 is a square wave pulse which varies between zero and the supply voltage in accordance with the frequency of the generator. This pulse is applied to the output of generator 10 by way of resistor 12, where it acts as a bias voltage and is added to the output of generator 10. The resulting voltage on the line at point A takes the form of wave 70 in FIG. 2A, and is fed back through voltage divider 64, 66 to provide a voltage having the form of wave 72, illustrated in FIG. 2B, to the emitter of Q3. This voltage also is fed back through capacitor 68 to produce a voltage having the form of wave 74 in FIG. 2C at the base of transistor Q3.

Figure 2B:
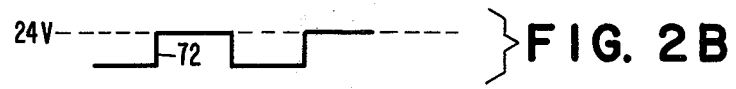
Figure 2C:
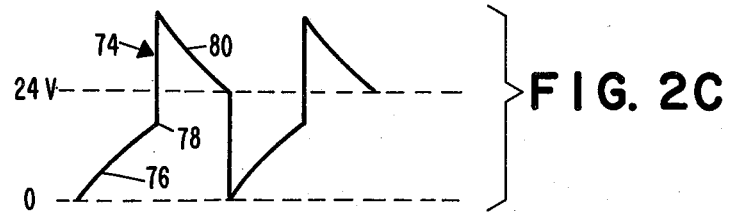
Figure 2D:
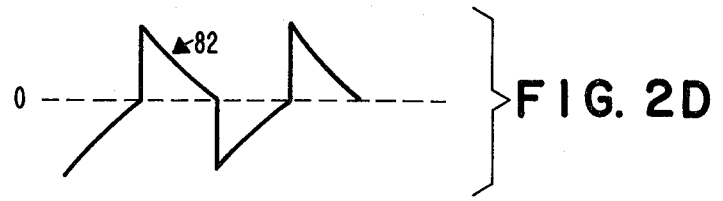

The application of a positive voltage by way of voltage divider 58, 60 to the variable resistor 62 causes the voltage at the base of Q3 to gradually rise, as illustrated at 76 in FIG. 2C. When the positive going portion of pulse 70 is applied to the output of the pulse generator 10, the voltage on the base of Q3 suddenly rises, as at 78 in FIG. 2C, switching Q3 thus Q4 off and preventing conduction and consequent oscillation. The high voltage on capacitor 68 will gradually bleed off through resistor 62, but will prevent oscillator as long as a positive voltage from generator 24 is applied to the output of generator 10. When the blocking pulse from generator 24 is removed, and the output at point A returns to zero potential, Q3 and Q4 become alternately conductive and nonconductive as capacitor 68 charges and discharges, thereby producing an alternating output signal on output point A. As long as no positive blocking pulse is produced, the oscillation continues. If there is a positive output from generator 24, oscillation ceases. The frequency at which the output of generator 10 oscillates depends upon the setting of variable resistor 62, and will normally be at an audio frequency. The length of each burst of oscillations will depend upon the frequency of the pulsed output from generator 24.

The feedback from the output on at A through resistor 64 to the emitter of Q3 biases Q3 with the voltage waveshape 72 (FIG. 2B). The difference between wave 74, at the base of Q3, and wave 72 is shown as wave 82. This latter wave will reach zero at a time when it is changing at a fast rate, instead of later during the discharge time constant of capacitor 68, which would cause erratic triggering of the oscillator. As noted on the waveform 82, the oscillator is triggered when the difference between waves 74 and 72 is zero.

Pulse generator 24 is essentially the same as generator 10, but its oscillations occur with a longer time period, on the order of one pulse per second. The longer time period is obtained in this circuit by increasing the values of the time constant determining components, in this case resistor 50 and capacitor 52. The addition of diode 48 to the circuit provides a current path which produces a time constant of $R_{50} \times C_{52}$ during the time that Q1 is off, and a time constant of $(R50 + R_i) \times C_{52}$ during the time Q1 is on. Since $R_i$, the input impedance of Q1, is large with respect to the value of resistance 50, the two time constants are approximately equal, and the resulting output pulse from generator 24 is a square wave of substantially symmetrical form which is used to modulate the output of oscillator 10 as described above.

The oscillating output signals from generator 24 are applied to the input of power amplifier 18 during the time that the output of pulse generator 24 is zero, thereby producing alarm signal outputs from the loudspeakers 22 of about one-half second duration separated by one-half second pauses. During the time that a positive blocking pulse is produced by pulse generator 24, the power amplifier is biased off, and produces no output.

The input to amplifier 18 is fed by way of line 16 to the base of a transistor Q5. The emitter of Q5 is connected through a first resistor 84 to ground and through a second resistor 86 to the supply line 40, whereby resistors 84 and 86 serve as a voltage divider to provide a suitable bias for Q5. The collector of Q5 is direct-connected to the base of a second, grounded-emitter amplifier stage transistor Q6. The collector of Q6 is connected through loudspeakers 22 to the voltage source 40.

The collector of transistor Q6 is also connected by way of a line 88 to a voltage limiter 90 which serves to limit the voltage applied to the loudspeakers. The limiter comprises a Zener diode 92 connected to line 88 and through a resistor 94 to the base of a transistor Q7. The emitter of Q7 is connected to voltage source 40, while its collector is connected by way of line 96 to line 14 and thence to amplifier Q5, thereby providing a negative feedback to the power amplifier. This negative feedback serves to limit the speaker voltage to about 13 volts, and permits operation of the unit with voltage input of up to 40 volts or greater.

It will be seen from the foregoing that the present invention operates to produce bursts of audio frequency signals from a sound generator 10, which signals are modulated, or blocked, periodically by the output from a pulse generator 24. The pulse generator output is a repetitive square wave which permits the audio signals to be fed in bursts through a power amplifier to suitable loudspeakers to produce the desired audio frequency pulses. Although the present invention has been disclosed in terms of a specific embodiment, it will be understood that modifications and variations can be made which are within the skill of the art without departing from the true spirit and scope of the invention as described in the following claims.

What is claimed is:

1. A backup alarm for vehicles for producing a pulsed audio signal, comprising:
    sound generator means having an input and an output, said generator comprising an audio frequency oscillator producing audio frequency signals at its output;
    means providing a variable time constant for for said audio frequency oscillator to vary the tone of said audio frequency signals;
    blocking pulse generating means having an input and an output, said blocking pulse generating means comprising a sub-audio frequency oscillator producing periodic blocking pulses at its output;
    amplifier means having an input and an output;
    means connecting the output of said sound generator means to said amplifier input to apply said audio frequency signals to said amplifier means;
    means connecting the outputs of said blocking pulse generating means and said sound generator means in parallel to said amplifier input and for connecting the output of said blocking pulse generator through a feedback loop to the input of said sound generator means, whereby the presence of a blocking pulse at the output of said blocking pulse generating means disables and amplifying means and said sound generator means;
    sound producing means;
    means connecting said amplifier output to said sound producing means, whereby said audio frequency output signals are amplified and applied to said sound producing means in the absence of said blocking pulses; and
    voltage limiter means comprising negative feedback means connected between the output and the input of said amplifier means to regulate the voltage provided at said amplifier output so that said alarm is adaptable for use with a variety of vehicles, and is operable with various power supply voltages.

2. The alarm of claim 1, wherein said audio frequency oscillator comprises:
    first and second transistors each having emitter, collector and base electrodes;
    means connecting the collector of said first transistor to the base of said second transistor, the collector of said second transistor being the output of said sound generator; and
    voltage divider feedback means connected between the output of said sound generator and said emitter of said first transistor.

3. The alarm of claim 2, wherein said oscillator further includes a feedback capacitor connected between said sound generator output and said base electrode of said first transistor.

4. The alarm of claim 1, wherein said oscillator for said blocking pulse generating means comprises:
    first and second transistors each having emitter, collector and base electrodes;
    means connecting the collector of said first transistor to the base of said second transistor, the collector of said second transistor being the output of said pulse generator;
    first feedback means connected between the output of said pulse generator and the emitter of said first transistor; and
    second feedback means including a resistor capacitor network for establishing the time constant of said pulse generator oscillator connected between the output of said pulse generator and the base of said first transistor.

* * * * *

UNITED STATES PATENT AND TRADEMARK OFFICE
CERTIFICATE OF CORRECTION

PATENT NO. : 3,943,507
DATED : March 9, 1976
INVENTOR(S) : Franklin D. Neal; Raymond Mirly It is certified that error appears in the above-identified patent and that said Letters Patent are hereby corrected as shown below:

Claim 1, line 25 (column 6, line 4) change "and", first occurrence, to --said--.

Signed and Sealed this eighteenth Day of May 1976

[SEAL]

Attest:

RUTH C. MASON
*Attesting Officer*

C. MARSHALL DANN
*Commissioner of Patents and Trademarks*